US012780711B2

(12) United States Patent
Suganuma et al.

(10) Patent No.: US 12,780,711 B2
(45) Date of Patent: Nov. 3, 2026

(54) METHOD OF MANUFACTURING OPTICAL FIBER PREFORM

(71) Applicant: SUMITOMO ELECTRIC INDUSTRIES, LTD., Osaka (JP)

(72) Inventors: Takahiro Suganuma, Osaka (JP); Takemi Hasegawa, Osaka (JP); Tooru Motofuji, Osaka (JP); Ayumi Inoue, Osaka (JP); Kazuo Kaneko, Osaka (JP)

(73) Assignee: SUMITOMO ELECTRIC INDUSTRIES, LTD., Saka (JP)

( * ) Notice: Subject to any disclaimer, the term of this patent is extended or adjusted under 35 U.S.C. 154(b) by 61 days.

(21) Appl. No.: 18/873,421

(22) PCT Filed: Jun. 1, 2023

(86) PCT No.: PCT/JP2023/020492
§ 371 (c)(1),
(2) Date: Dec. 10, 2024

(87) PCT Pub. No.: WO2024/004512
PCT Pub. Date: Jan. 4, 2024

(65) Prior Publication Data

US 2026/0008713 A1 Jan. 8, 2026

(30) Foreign Application Priority Data

Jun. 27, 2022 (JP) ................................ 2022-102859

(51) Int. Cl.
*C03B 37/012* (2006.01)
*C03B 23/207* (2006.01)

(52) U.S. Cl.
CPC ...... *C03B 37/01222* (2013.01); *C03B 23/207* (2013.01)

(58) Field of Classification Search
None
See application file for complete search history.

(56) References Cited

U.S. PATENT DOCUMENTS 4,832,720 A 5/1989 Watanabe et al.
6,178,779 B1 * 1/2001 Drouart ................ C03B 23/207 65/36
2017/0320768 A1 11/2017 Ma et al.
(Continued)

FOREIGN PATENT DOCUMENTS

JP H08109036 A * 4/1969 .......... C03B 37/035
JP S61-201633 A 9/1986
(Continued)

OTHER PUBLICATIONS

JPH08109036A EPO Machine Translation retrieved Apr. 14, 2026. (Year: 2026).*
(Continued)

*Primary Examiner* — Lisa L Herring
(74) *Attorney, Agent, or Firm* — McDonald Hopkins LLC

(57) ABSTRACT

The optic fiber base material production method includes melting and connecting glass pipes to both ends of a clad pipe, in which holes are provided, so as to surround the holes, heating the connections of the clad pipe and glass pipes at a heating temperature below the melting temperature of the connections, and slowly cooling the connections from the heating temperature after heating.

10 Claims, 7 Drawing Sheets

(56) References Cited

U.S. PATENT DOCUMENTS

| | | | | |
|---|---|---|---|---|
| 2020/0231488 | A1* | 7/2020 | Ganz | C03B 23/207 |
| 2020/0369555 | A1* | 11/2020 | Amma | C03B 37/0128 |
| 2021/0130221 | A1 | 5/2021 | Ma et al. | |

FOREIGN PATENT DOCUMENTS

| | | | | | |
|---|---|---|---|---|---|
| JP | 2005-336028 | A | | 12/2005 | |
| JP | 2011168464 | A | * | 9/2011 | |
| JP | 2013-001629 | A | | 1/2013 | |
| JP | 2017-206432 | A | | 11/2017 | |
| JP | 2019-031427 | A | | 2/2019 | |
| WO | 2007/039426 | A1 | | 4/2007 | |
| WO | WO-2011052497 | A1 | * | 5/2011 | C03B 37/01208 |

OTHER PUBLICATIONS

JP-2011168464-A Clarivate Analytics Machine Translation retrieved Apr. 14, 2026. (Year: 2026).*

Britannica Online Encyclopedia, "Industrial Glass", https://www.britannica.com/science/industrial-glass, retrieved Sep. 2014, 26 pages. (Year: 2014).*

WO-2011052497-A1 Machine Translation by Clarivate Analytics retrieved Apr. 14, 2026. (Year: 2026).*

* cited by examiner

METHOD OF MANUFACTURING OPTICAL FIBER PREFORM

TECHNICAL FIELD

The present disclosure relates to a method of manufacturing an optical fiber preform. This application claims priority based on Japanese Patent Application No. 2022-102859 filed on Jun. 27, 2022, and the entire contents of the Japanese Patent Application are incorporated herein by reference.

BACKGROUND ART

A rod-in-collapse method is known as a method of manufacturing an optical fiber preform (for example, Patent literature 1 and Patent literature 2). In the rod-in-collapse method, a core rod is inserted into a cladding pipe provided with a hole, and the cladding pipe and the core rod are integrated by heating.

CITATION LIST

Patent Literature

Patent literature 1: Japanese Unexamined Patent Application Publication No. S61-201633
Patent literature 2: Japanese Unexamined Patent Application Publication No. 2011-168464

SUMMARY OF INVENTION

A method of manufacturing an optical fiber preform according to an aspect of the present disclosure includes melting and connecting a glass pipe to each end of a cladding pipe provided with a hole so as to surround the periphery of the hole, heating a connecting part between the cladding pipe and the glass pipe at a heating temperature below a melting temperature of the connecting part, and slowly cooling the connecting part from the heating temperature after the heating.

DETAILED DESCRIPTION

Figure 1:
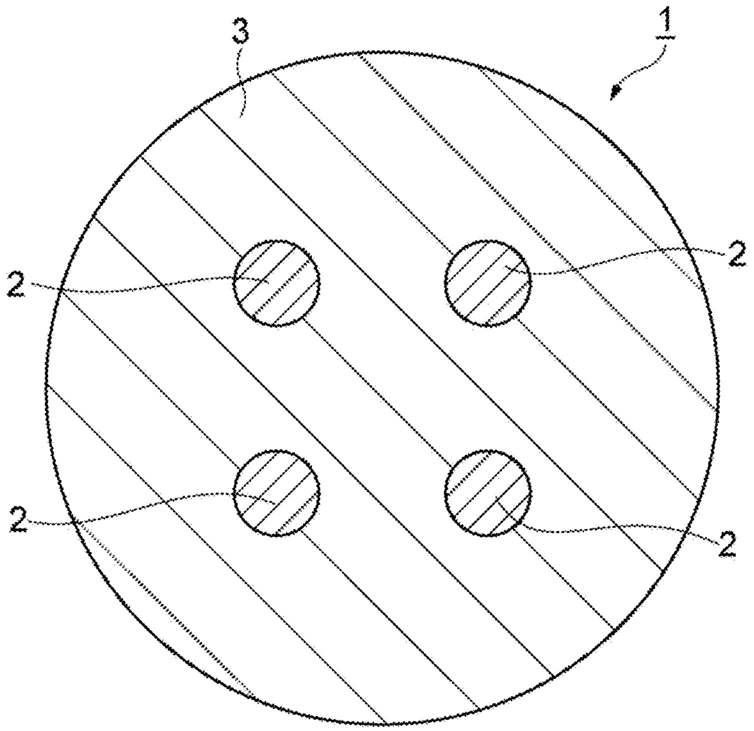
FIG. 1 is a cross-sectional view of an optical fiber preform manufactured in an embodiment.

Problems to be Solved by Present Disclosure

In a rod-in-collapse method, a technique is adopted in which a glass pipe is melted and connected to each end of a cladding pipe, and a process gas is supplied to and discharged from the cladding pipe through each glass pipe. In the conventional method, the cladding pipe and the glass pipe may be separated at a connecting part therebetween, or the connecting part may crack.

An object of the present disclosure is to provide a method of manufacturing an optical fiber preform in which the separation of a cladding pipe and a glass pipe at a connecting part therebetween and the cracking of the connecting part can be suppressed.

Advantageous Effects of Present Disclosure

According to the present disclosure, it is possible to provide a method of manufacturing an optical fiber preform in which the separation of a cladding pipe and a glass pipe at a connecting part therebetween and the cracking of the connecting part can be suppressed.

Description of Embodiments of Present Disclosure

First, embodiments of the present disclosure will be listed and described.

(1) A method of manufacturing an optical fiber preform according to an aspect of the present disclosure includes melting and connecting a glass pipe to each end of a cladding pipe provided with a hole so as to surround a periphery of the hole, heating a connecting part between the cladding pipe and the glass pipe at a heating temperature below a melting temperature of the connecting part, and slowly cooling the connecting part from the heating temperature after the heating.

In the method of manufacturing an optical fiber preform, glass strain introduced into the connecting part by melting and connecting the glass pipe to the cladding pipe is relieved by heating, and microcracks remaining in the connecting part are repaired by heating. By slowly cooling the connecting part rather than rapidly cooling, the connecting part can be cooled down to a room temperature while the occurrence of a new glass strain is suppressed. Thus, the separation of the glass pipe and the cladding pipe at the connecting part and the cracking of the connecting part can be suppressed.

(2) In the above (1), a heating time of the heating may be 5 minutes or longer. In this case, the glass strain is easily relieved and the microcracks are easily repaired.

(3) In the above (1) or (2), the heating temperature may be 900° C. or higher. In this case, the glass strain is easily relieved and the microcracks are easily repaired.

(4) In any one of the above (1) to (3), in the slowly cooling, a maximum cooling rate may be 100° C./min or lower until a temperature of the connecting part reaches 400° C. In this case, the glass strain is easily relieved, and the microcracks are easily repaired.

(5) In any one of the above (1) to (4), in the slowly cooling, a difference between a surface temperature of the cladding pipe at a position away from the connecting part by 10 mm in an axial direction and a surface temperature of the glass pipe at a position away from the connecting part by 10 mm in the axial direction may be 0° C. to 200° C. In this case, the occurrence of the glass strain in the connecting part is suppressed.

(6) In any one of the above (1) to (5), the heating and the slowly cooling may be performed by using a heating furnace. This allows a larger area to be heated more easily than when using the flame, so that the connecting part can be uniformly heated. Thus, the glass strain in the connecting part is easily relieved.

(7) In any one of the above (1) to (5), the heating and the slowly cooling may be performed by using flame. In this case, it is easier to visually check the connecting part than when using the heating furnace.

(8) In any one of the above (1) to (7), when rapid cooling of the connecting part occurs after the slowly cooling, the heating and the slowly cooling may be reperformed. In this case, the glass strain caused by rapid cooling can be relieved.

(9) In any one of the above (1) to (7), the method of manufacturing an optical fiber preform may further include, after the slowly cooling, performing a gas-phase treatment on an inner surface of the hole by flowing a gas through the hole, or inserting a core rod into the hole. After the performing a gas-phase treatment or the inserting, the heating and the slowly cooling may be reperformed. In this case, the glass strain caused by rapid cooling in the course of the gas-phase treatment can be relieved.

(10) In any one of the above (1) to (9), the optical fiber preform may be a multi-core optical fiber preform. In this case, the glass pipe needs to surround all of the plurality of holes provided in the cladding pipe, and thus the glass pipe tends to have a larger diameter than in a case of a single-core optical fiber preform. A glass pipe having a large diameter has a larger change in heat capacity and thermal expansion coefficient due to the shape than a glass pipe having a small diameter. Thus, glass strain is easily introduced into the connecting part, and microcracks are likely to remain. Thus, the effect of the heating and the slowly cooling is large.

Details of Embodiments of Present Disclosure

Specific examples of the method of manufacturing an optical fiber preform according to the present disclosure will be described below with reference to the drawings. The present invention is not limited to these examples, but is defined by the scope of the claims, and is intended to include all modifications within the meaning and scope equivalent to the scope of the claims. In the description of the drawings, the same elements are denoted by the same reference numerals, and redundant descriptions thereof will be omitted.

FIG. 1 is a cross-sectional view of an optical fiber preform manufactured in an embodiment. In this figure, a cross section perpendicular to the central axis of an optical fiber preform 1 is shown. Optical fiber preform 1 is a multi-core optical fiber preform including a plurality of core portions 2 and a common cladding portion 3. In the present embodiment, the number of core portions 2 is four.

The plurality of core portions 2 each extend along a central axis of optical fiber preform 1. The plurality of core portions 2 are arranged at positions that are rotationally symmetric with respect to the central axis in a cross section orthogonal to the central axis. The cross-sectional shapes of the plurality of core portions 2 are the same circular shape as each other. Core portions 2 may have a diameter of, for example, 4 mm to 50 mm, 5 mm to 30 mm, or 6 mm to 12 mm. In an optical fiber formed from the multi-core optical fiber preform, the optical fiber has cores with a diameter of 6 μm to 15 μm. Cladding portion 3 surrounds the plurality of core portions 2. Cladding portion 3 may have a diameter of, for example, 40 mm to 180 mm, or 40 mm to 120 mm. In the optical fiber formed from the multi-core optical fiber preform, the optical fiber has a cladding with a diameter of 124 μm to 126 μm.

Refractive indices of core portions 2 are higher than a refractive index of cladding portion 3. Core portions 2 and cladding portion 3 are made of a silica-based glass material. Core portions 2 and cladding portion 3 each contain silica glass as a main component and a dopant for adjusting a refractive index.

Figure 2:
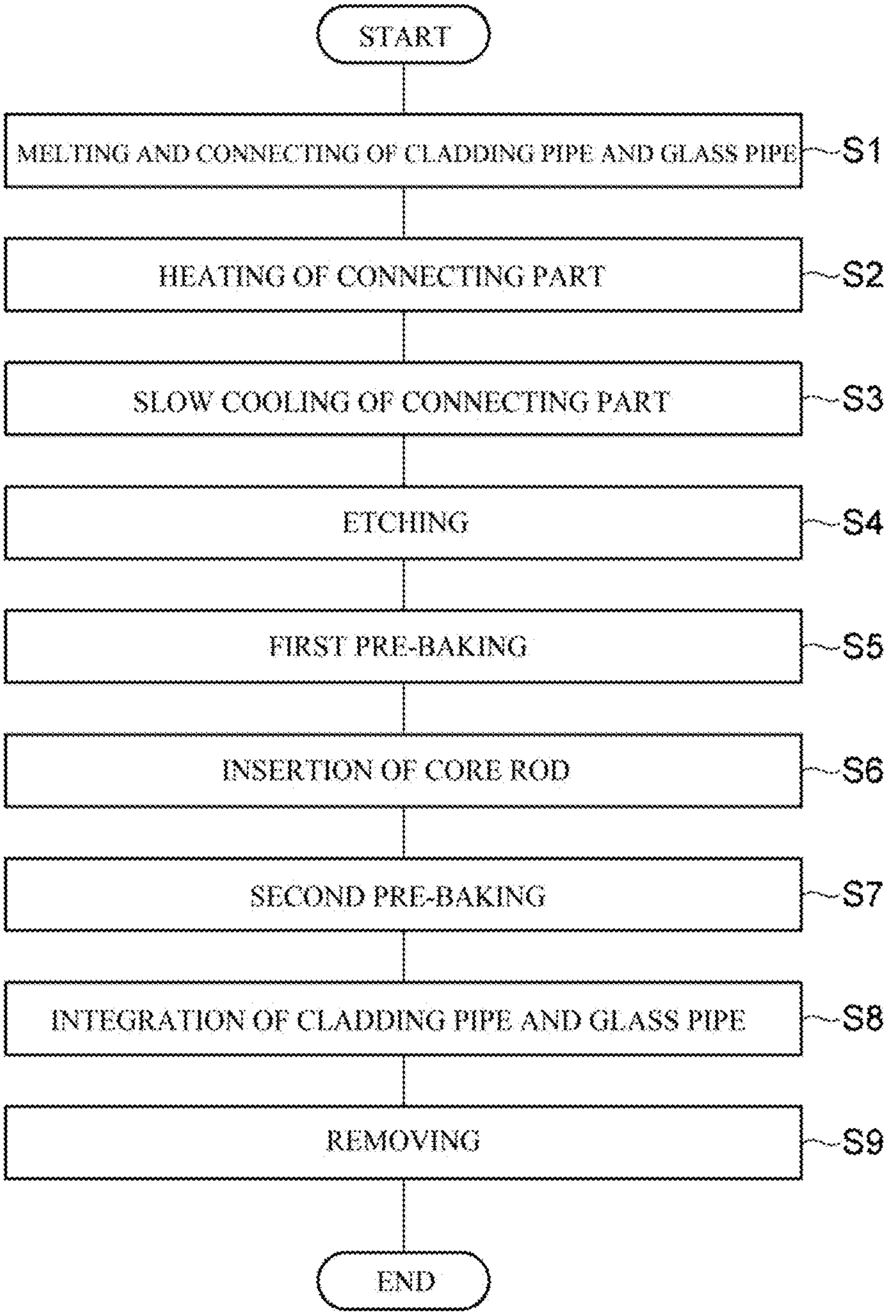
FIG. 2 is a flowchart illustrating a method of manufacturing an optical fiber preform according to the embodiment.

FIG. 2 is a flowchart illustrating a method of manufacturing an optical fiber preform according to the embodiment. As shown in FIG. 2, the method of manufacturing optical fiber preform 1 includes a connecting step S1, a heating step S2, a slow cooling step S3, an etching step S4, a first pre-baking step S5, an inserting step S6, a second pre-baking step S7, an integrating step S8, and a removing step S9.

Figure 3:
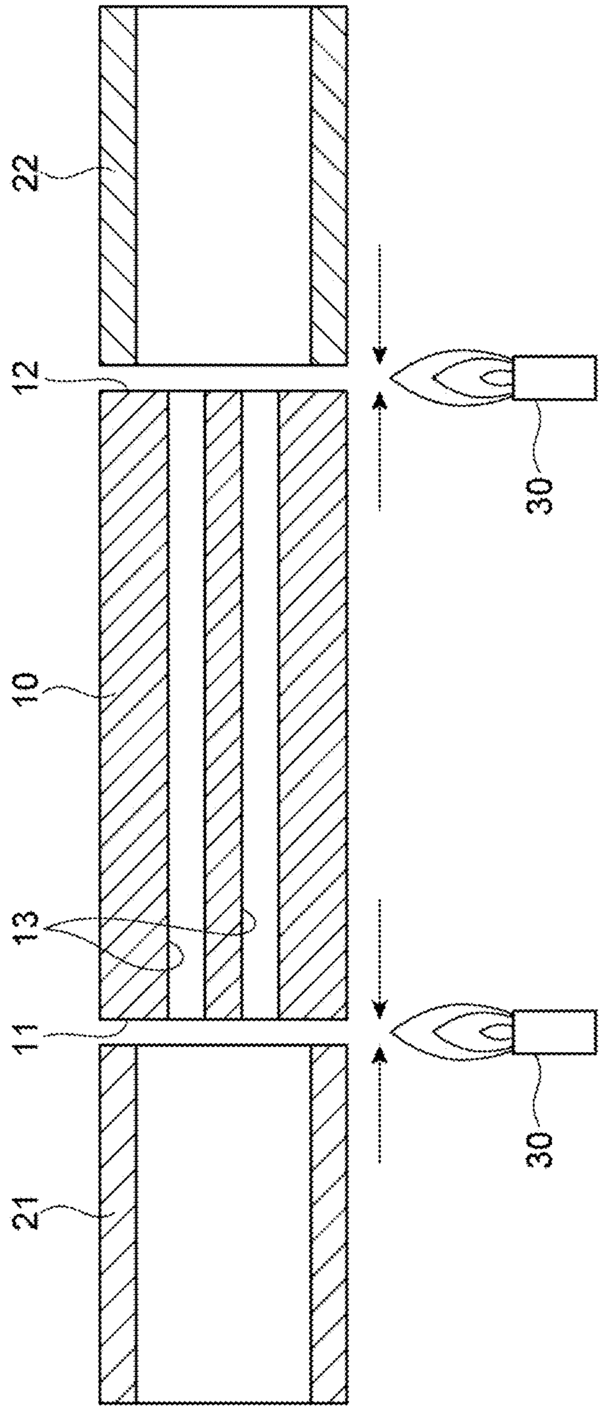
FIG. 3 is a cross-sectional view illustrating a connecting step.

FIG. 3 is a cross-sectional view illustrating the connecting step. In this figure, a cross section taken along an axial direction of a cladding pipe 10 (hereinafter, also simply referred to as an "axial direction") is shown. The connecting step S1 is a step of melting and connecting a first glass pipe 21 to a first end 11 of cladding pipe 10 and melting and connecting a second glass pipe 22 to a second end 12 of cladding pipe 10. By the connecting step S1, a connecting part 31 (see FIG. 4) between first end 11 and first glass pipe 21 is formed, and a connecting part 32 (see FIG. 4) between second end 12 and second glass pipe 22 is formed. The connecting step S1 is performed by using flame of a burner 30.

Cladding pipe 10 is a glass pipe to be cladding portion 3, and has a shape corresponding to cladding portion 3. A cross section of cladding pipe 10 orthogonal to the axial direction has a circular outer shape, and may have an outer diameter of, for example, 40 mm to 180 mm, or 40 mm to 120 mm. Cladding pipe 10 is provided with one or more holes 13 (core holes). Holes 13 are through holes each extending in the axial direction. Cladding pipe 10 is produced by, for example, drilling holes 13 in a cylindrical glass member. Holes 13 have a circular shape in cross section. In the present embodiment, the number of holes 13 is four.

First glass pipe 21 and second glass pipe 22 are working pipes for supporting the cladding pipe, and are provided for introducing a process gas into holes 13 of cladding pipe 10 in a later step. For example, first glass pipe 21 is connected to a process gas supply system, and second glass pipe 22 is connected to a process gas discharge system.

First glass pipe 21 and second glass pipe 22 have, for example, the same shape as each other. First glass pipe 21 and second glass pipe 22 are made of, for example, a same glass material. First glass pipe 21 and second glass pipe 22 have a circular pipe shape. Outer diameters of first glass pipe 21 and second glass pipe 22 are substantially the same as an outer diameter of cladding pipe 10 in the present embodiment, but may be smaller than the outer diameter of cladding pipe 10.

First glass pipe 21 surrounds a periphery of the plurality of holes 13 at first end 11 and is melted and connected to first end 11 so as to be coaxial with cladding pipe 10. That is, when viewed from the axial direction, the plurality of holes 13 are entirely disposed inside first glass pipe 21. Second glass pipe 22 surrounds a periphery of the plurality of holes 13 at second end 12 and is melted and connected to second end 12 so as to be coaxial with cladding pipe 10. That is, when viewed from the axial direction, the plurality of holes 13 are entirely disposed inside second glass pipe 22.

When there is a difference between a heat capacity of cladding pipe 10 and a heat capacity of first glass pipe 21, or when there is a difference between a thermal expansion coefficient of cladding pipe 10 and a thermal expansion coefficient of first glass pipe 21, glass strain may occur in connecting part 31 during heating and cooling process. When there is a difference between the heat capacity of cladding pipe 10 and a heat capacity of second glass pipe 22, or when there is a difference between the thermal expansion coefficient of cladding pipe 10 and a thermal expansion coefficient of second glass pipe 22, glass strain may occur in connecting part 32 during the heating and cooling process. In connecting parts 31 and 32, microcracks introduced into processed surfaces during the pre-processing of cladding pipe 10, first glass pipe 21, and second glass pipe 22 may remain. As a result of the investigation, it has been found that such glass strain and microcracks cause the cladding pipe and the glass pipes to be separated at connecting parts 31 and 32, and connecting parts 31 and 32 to be cracked, in a later step in which connecting parts 31 and 32 are heated and cooled.

Figure 4:
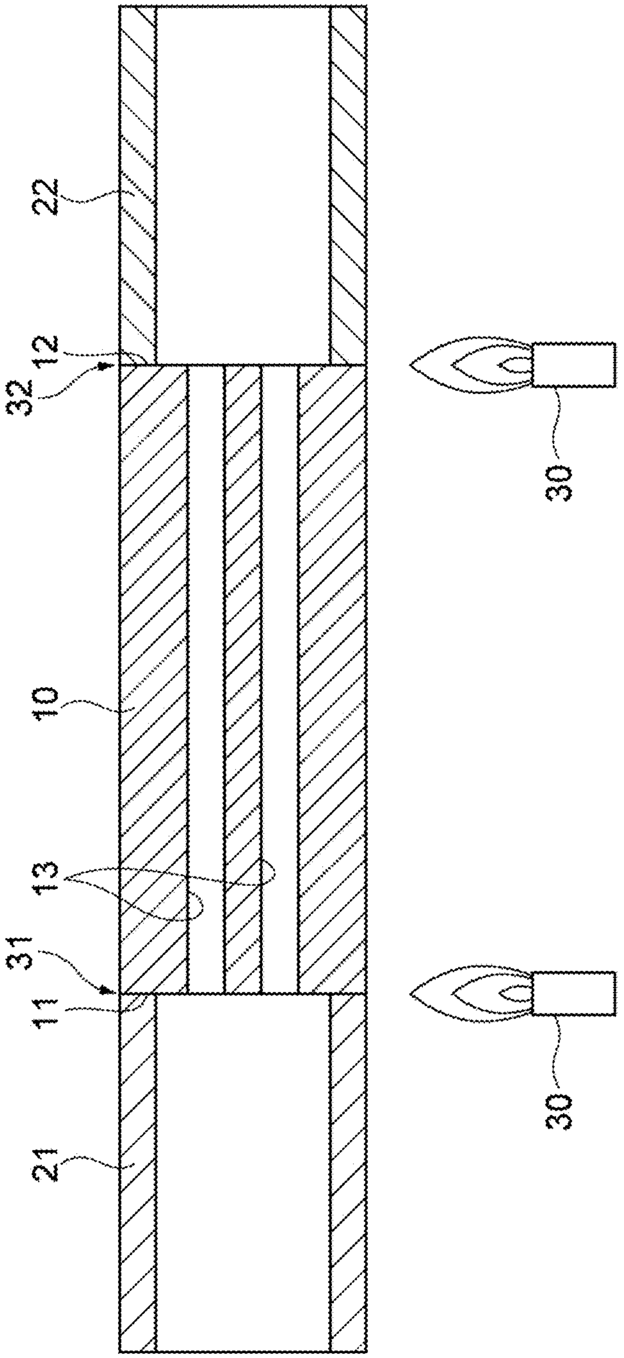
FIG. 4 is a cross-sectional view illustrating a heating step and a slow cooling step.

FIG. 4 is a cross-sectional view illustrating the heating step and the slow cooling step. In this figure, a cross section taken along the axial direction of cladding pipe 10 is shown. The heating step S2 is a step of heating connecting part 31 at a heating temperature below a melting temperature of connecting part 31 and heating connecting part 32 at a heating temperature below a melting temperature of connecting part 32. The glass strain generated in connecting parts 31 and 32 in the connecting step S1 is relieved by heating, and the microcracks remaining in connecting parts 31 and 32 are repaired by heating. The heating step S2 is performed by using flame of burner 30 and directly heating connecting parts 31 and 32 with the flame of burner 30.

Here, the melting temperature is the lowest temperature at which a viscosity of glass becomes less than $10^{6.6}$ Pa·s. When a melting temperature of cladding pipe 10 and a melting temperature of first glass pipe 21 are different from each other, the melting temperature of connecting part 31 is the lower one of the melting temperature of cladding pipe 10 and the melting temperature of first glass pipe 21. When the melting temperature of cladding pipe 10 and a melting temperature of second glass pipe 22 are different from each other, the melting temperature of connecting part 32 is the lower one of the melting temperature of cladding pipe 10 and the melting temperature of second glass pipe 22. The viscosity of glass can be measured by, for example, a ball-penetration method or a parallel plate method.

As the heating temperature in the heating step S2 is closer to the melting temperatures of connecting parts 31 and 32, the glass strain and the microcracks are more easily relieved. Thus, the heating temperature is appropriately set depending on the melting temperatures of connecting parts 31 and 32. The heating temperature is, for example, 900° C. or higher. Temperatures of connecting parts 31 and 32 are measured as the temperatures of outermost surfaces of connecting parts 31 and 32 by, for example, a pyrometer.

As the heating time in the heating step S2 is longer, the glass strain and the microcracks are more easily relieved. The heating time may be set to, for example, 5 minutes or longer. When connecting parts 31 and 32 have a large diameter, it takes time to relieve the glass strain and the microcracks. For example, when connecting parts 31 and 32 have an outer diameter of 80 mm or more, the heating time may be 15 minutes or longer. The longer the heating time, the lower the production efficiency of optical fiber preform 1, and thus the heating time may be set to, for example, 60 minutes or shorter.

The slow cooling step S3 is a step of slowly cooling connecting parts 31 and 32 from the heating temperature in the heating step S2, which is performed after the heating step S2 and continuously with the heating step S2. When connecting parts 31 and 32 are rapidly cooled by natural cooling, glass strain is likely to occur in connecting parts 31 and 32. The slow cooling step S3 can suppress the occurrence of glass strain in connecting parts 31 and 32. In the slow cooling step S3, a time until a temperature of each of connecting parts 31 and 32 reaches 400° C. is 5 minutes or longer. As this time is longer, the glass strain and the microcracks are more easily relieved, but the production efficiency of optical fiber preform 1 is reduced. This time may be, for example, 60 minutes or shorter.

In the slow cooling step S3, the cooling rate is 100° C./min or lower until a temperature of each of connecting parts 31 and 32 reaches 400° C. As the cooling rate is lower, the glass strain and the microcracks are more easily relieved, but the production efficiency of optical fiber preform 1 is reduced. The cooling rate may be set to, for example, 15° C./min or higher. The slow cooling step S3 is performed by using the flame of burner 30 and directly heating connecting parts 31 and 32 with the flame of burner 30.

In the slow cooling step S3, a difference in surface temperatures between the positions away from connecting part 31 by +10 mm and −10 mm in the axial direction and a difference in surface temperatures between the positions away from connecting part 32 by +10 mm and −10 mm in the axial direction are 0° C. to 200° C., respectively. That is, a difference between a surface temperature of cladding pipe 10 at a position away from connecting part 31 by 10 mm in the axial direction and a surface temperature of first glass pipe 21 at a position away from connecting part 31 by 10 mm in the axial direction is 0° C. to 200° C. Further, a difference between the surface temperature of cladding pipe 10 at a position away from connecting part 32 by 10 mm in the axial direction and a surface temperature of second glass pipe 22 at a position away from connecting part 32 by 10 mm in the axial direction is 0° C. to 200° C.

Figure 5:
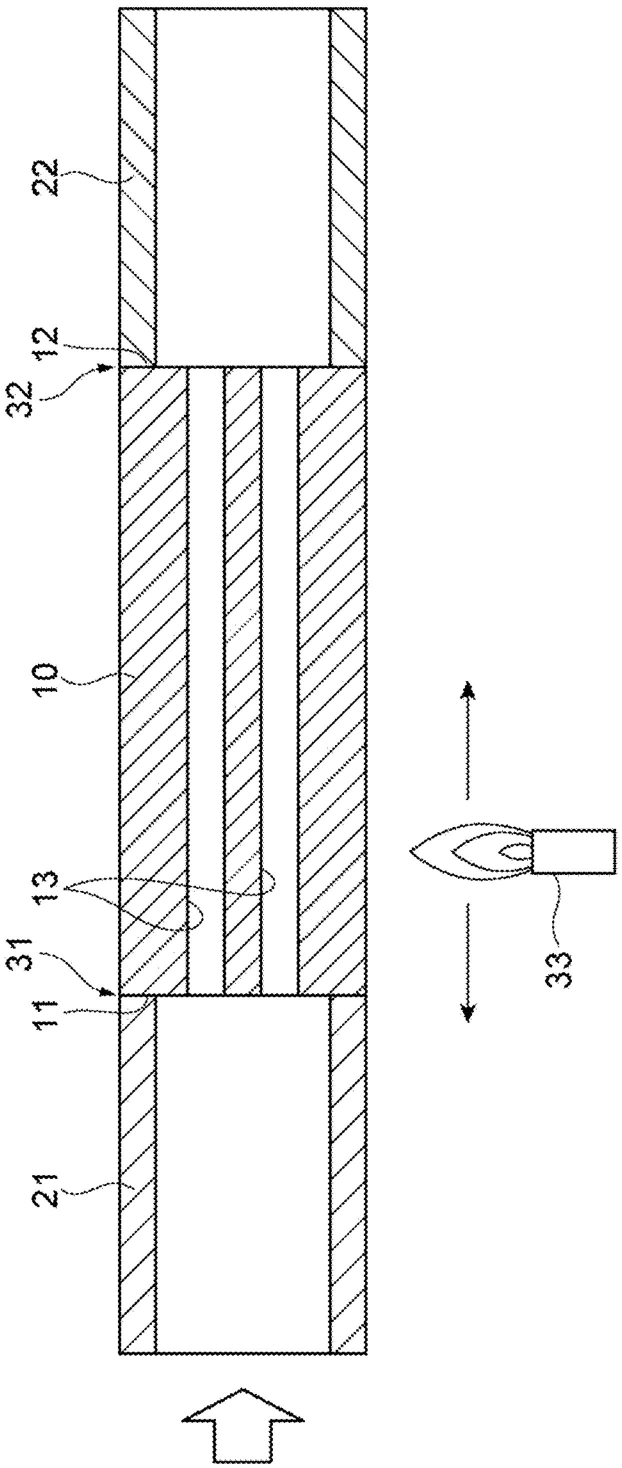
FIG. 5 is a cross-sectional view illustrating an etching step.

FIG. 5 is a cross-sectional view illustrating the etching step. In this figure, a cross section taken along the axial direction of cladding pipe 10 is shown. The etching step S4 is a step of performing an etching treatment (gas-phase treatment) on inner surfaces of holes 13 by flowing a gas (process gas) through holes 13 of cladding pipe 10. The etching treatment is performed, for example, by heating an outer circumferential surface of cladding pipe 10 with an external heat source 33 such as a burner while cladding pipe 10 is rotated around the axial direction. The etching treatment removes impurities on the inner surfaces of holes 13 and smooths the inner surfaces of holes 13.

The gas introduced into holes 13 is, for example, an etching gas such as $SF_6$. The gas is supplied to holes 13 of cladding pipe 10 through first glass pipe 21. The gas flows through holes 13 and is then exhausted to the outside through second glass pipe 22. The etching treatment is performed with first glass pipe 21 and second glass pipe 22 rotatably held by holding parts (not shown) of a glass lathe. Since the holding parts hold first glass pipe 21 and second glass pipe 22, not cladding pipe 10, which is heated by the external heat source, the thermal influence on the holding parts can be suppressed.

The first pre-baking step S5 is a step of performing a pre-baking treatment (gas-phase treatment) on the inner surfaces of holes 13 while a gas (process gas) flows through holes 13 of cladding pipe 10. As in the etching treatment, the first pre-baking treatment is performed, for example, by heating the outer circumferential surface of cladding pipe 10 with an external heat source while cladding pipe 10 is rotated around the axial direction. The first pre-baking treatment removes foreign substances on the inner surfaces of holes 13 and smooths the inner surfaces of holes 13.

The gas introduced into holes 13 is, for example, a gas for cleaning treatment (that is, a pre-baking gas) such as chlorine or oxygen. The gas is supplied to holes 13 of cladding pipe 10 through first glass pipe 21. The gas flows through holes 13 and is then discharged to the outside through second glass pipe 22. As in the etching treatment, the first pre-baking treatment is performed with first glass pipe 21 and second glass pipe 22 rotatably held by holding parts (not shown) of a glass lathe.

Figure 6:
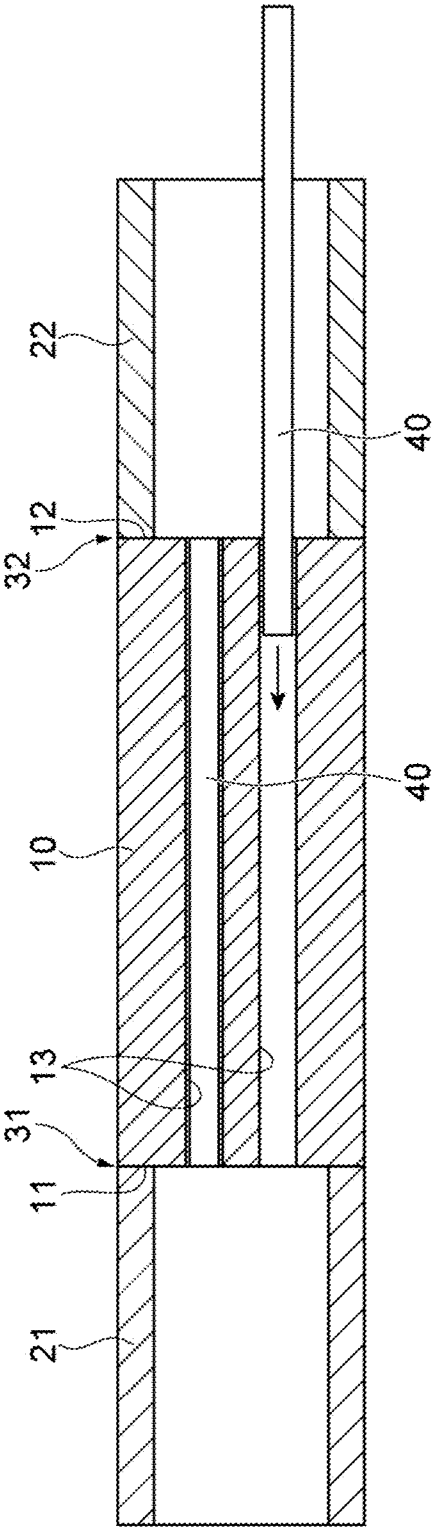
FIG. 6 is a cross-sectional view illustrating an inserting step.

FIG. 6 is a cross-sectional view illustrating the inserting step. In this figure, a cross section taken along the axial direction of cladding pipe 10 is shown. The inserting step S6 is a step of inserting each of core rods 40 into a corresponding one of holes 13 of cladding pipe 10. Core rods 40 are glass rods that serve as core portions 2. Each of core rods 40 has an outer diameter slightly smaller than a diameter of the corresponding one of holes 13. Each of core rods 40 passes through second glass pipe 22 and is inserted into the corresponding one of holes 13 from second end 12 of cladding pipe 10.

The second pre-baking step S7 is a step of performing a pre-baking treatment (gas-phase treatment) on outer surfaces of core rods 40 while a gas (process gas) flows through holes 13 of cladding pipe 10. As in the etching treatment, the second pre-baking treatment is performed, for example, by heating the outer circumferential surface of cladding pipe 10 with an external heat source while cladding pipe 10 is rotated around the axial direction. The second pre-baking treatment removes foreign substances on the outer surfaces of core rods 40 and the inner surfaces of holes 13, and smooths the outer surfaces of core rods 40 and the inner surfaces of holes 13.

As in the first pre-baking treatment, the gas introduced into hole 13 is a gas for cleaning treatment (that is, a pre-baking gas) such as chlorine or oxygen. The gas is supplied to holes 13 of cladding pipe 10 through first glass pipe 21. The gas flows through holes 13 and is then discharged to the outside through second glass pipe 22. As in the etching treatment, the second pre-baking treatment is performed with first glass pipe 21 and second glass pipe 22 rotatably held by holding parts (not shown) of a glass lathe.

The integrating step S8 is a step of integrating cladding pipe 10 and core rods 40 by heating. Optical fiber preform 1 is produced by the heating and integrating treatment. As in the etching treatment, the heating and integrating treatment is performed, for example, by heating the outer circumferential surface of cladding pipe 10 with an external heat source while cladding pipe 10 is rotated around the axial direction. The heating and integrating treatment is performed with first glass pipe 21 and second glass pipe 22 rotatably held by holding parts (not shown) of a glass lathe.

The removing step S9 is a step of removing first glass pipe 21 and second glass pipe 22 from optical fiber preform 1. Through the above steps, optical fiber preform 1 is manufactured.

As described above, in the method of manufacturing optical fiber preform 1, the glass strain introduced into connecting parts 31 and 32 in the connecting step S1 is relieved in the heating step S2, and the microcracks remaining in connecting parts 31 and 32 are repaired in the heating step S2. By slowly cooling connecting parts 31 and 32 over a sufficient time without rapid cooling, connecting parts 31 and 32 can be cooled down to a room temperature while the occurrence of a new glass strain is suppressed. Thus, the separation at the connecting parts 31 and 32, and the cracking of the connecting parts 31 and 32 can be suppressed.

In the heating step S2, the heating time is 5 minutes or longer, and the heating temperature is 900° C. or higher. Thus, the glass strain is easily relieved and the microcracks are easily repaired. In the slow cooling step S3, the time until the temperature of each of connecting parts 31 and 32 reaches 400° C. is 5 minutes or longer, and the cooling rate is 100° C./min or lower until the temperature of each of the connecting parts reaches 400° C. Thus, the glass strain is easily relieved and the microcracks are easily repaired. In the slow cooling step S3, the difference in surface temperatures between the positions away from connecting part 31 by +10 mm and −10 mm in the axial direction and the difference in surface temperatures between the positions away from connecting part 32 by +10 mm and −10 mm in the axial direction are 0° C. to 200° C., respectively. Thus, the occurrence of glass strain in connecting parts 31 and 32 is suppressed.

Figure 7:
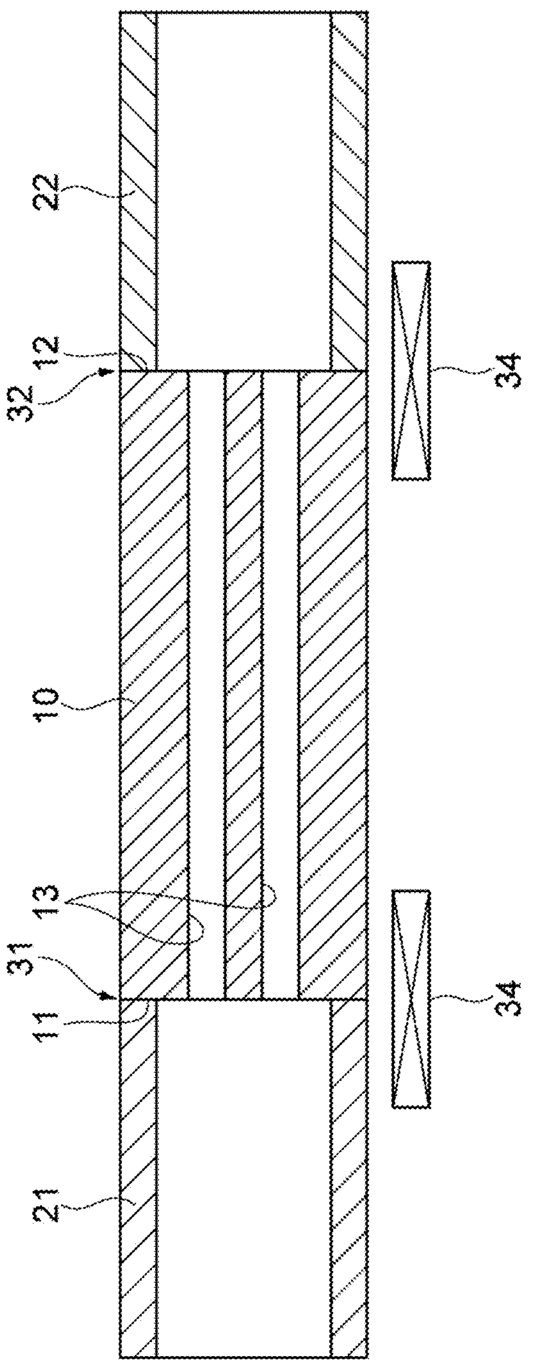
FIG. 7 is a cross-sectional view illustrating a heating step and a slow cooling step according to a modification.

Since the heating step S2 and the slow cooling step S3 are performed by using flame of burner 30, it is easier to visually check connecting parts 31 and 32 than when using a heating furnace 34 (see FIG. 7).

Optical fiber preform 1 is a multi-core optical fiber preform. First glass pipe 21 and second glass pipe 22 need to surround all of the plurality of holes 13 provided in cladding pipe 10, and thus, first glass pipe 21 and second glass pipe 22 tend to have a larger diameter than a diameter in a case of the single-core optical fiber preform. Since it takes time to connect a glass pipe having a large diameter to cladding pipe 10, glass strain is easily introduced into connecting parts 31 and 32, and microcracks are also likely to remain. Thus, the effect of relieving glass strain and microcracks by heating and slow cooling is large.

Although the embodiments have been described above, the present disclosure is not necessarily limited to the above-described embodiments, and various modifications can be made without departing from the gist of the present disclosure.

In the above embodiment, the heating step S2 and the slow cooling step S3 are performed only once, but the heating step S2 and the slow cooling step S3 may be reperformed after the slow cooling step S3. In the method of manufacturing optical fiber preform 1, there may be a case in which connecting parts 31 and 32 are heated and rapidly cooled after the slow cooling step S3. In this case, glass strain may occur in connecting parts 31 and 32. Thus, when rapid cooling of connecting parts 31 and 32 occurs, the heating step S2 and the slow cooling step S3 may be reperformed. Here, the rapid cooling means that connecting parts 31 and 32 are cooled at a maximum cooling rate higher than 100° C./min after the heating of connecting parts 31 and 32 is stopped. Such heating step S2 and slow cooling step S3 may be repeated, for example, each time connecting parts 31 and 32 are rapidly cooled after the slow cooling step S3.

Specifically, the heating step S2 and the slow cooling step S3 may be reperformed after the etching step S4, the first pre-baking step S5, the inserting step S6, or the second pre-baking step S7. More specifically, the heating step S2 and the slow cooling step S3 may be reperformed after the etching step S4 and before the first pre-baking step S5, after the first pre-baking step S5 and before the inserting step S6, after the inserting step S6 and before the second pre-baking step S7, or after the second pre-baking step S7 and before the integrating step S8. This can relieve the glass strain caused by rapid cooling.

FIG. 7 is a cross-sectional view illustrating the heating step and the slow cooling step according to a modification. As shown in FIG. 7, the heating step S2 and the slow cooling step S3 may be performed by using furnace heat of a heating furnace 34. Heating furnace 34 is, for example, an electric furnace, and has a capability of heating by a heat source other than the flame. Heating furnace 34 is provided at each position where connecting parts 31 and 32 can be heated. When heating furnace 34 is used, heating furnace 34 allows a larger area to be heated more easily than when using the flame of burner 30, and thus connecting parts 31 and 32 can be uniformly heated. Thus, the glass strain of connecting parts 31 and 32 is easily relieved.

In the above embodiment, optical fiber preform 1 is a multi-core optical fiber preform, but may be a single-core optical fiber preform.

The above embodiments and modifications may be combined as appropriate.

REFERENCE SIGNS LIST

1 optical fiber preform
2 core portion
3 cladding portion
10 cladding pipe
11 first end
12 second end
13 hole
21 first glass pipe
22 second glass pipe
30 burner
31 connecting part
32 connecting part
33 external heat source
34 heating furnace
40 core rod

What is claimed is:

1. A method of manufacturing an optical fiber preform, the method comprising:
- melting and connecting a glass pipe to each end of a cladding pipe provided with a hole so as to surround a periphery of the hole;
- heating a connecting part between the cladding pipe and the glass pipe at a heating temperature below a melting temperature of the connecting part;
- after the heating, slowly cooling the connecting part from the heating temperature; and
- after the slowly cooling, performing a gas-phase treatment on an inner surface of the hole by flowing a gas through the hole, or inserting a core rod into the hole,
- wherein, after the performing a gas-phase treatment or the inserting, the heating and the slowly cooling are reperformed.

2. The method of manufacturing an optical fiber preform according to claim 1,
- wherein a heating time of the heating is 5 minutes or longer.

3. The method of manufacturing an optical fiber preform according to claim 1,
- wherein the heating temperature is 900° C. or higher.

4. The method of manufacturing an optical fiber preform according to claim 1,
- wherein in the slowly cooling, a maximum cooling rate is 100° C./min or lower until a temperature of the connecting part reaches 400° C.

5. The method of manufacturing an optical fiber preform according to claim 1,
- wherein in the slowly cooling, a difference between a surface temperature of the cladding pipe at a position away from the connecting part by 10 mm in an axial direction and a surface temperature of the glass pipe at a position away from the connecting part by 10 mm in the axial direction is 0° C. to 200° C.

6. The method of manufacturing an optical fiber preform according to claim 1,
- wherein the heating and the slowly cooling are performed by using a heating furnace.

7. The method of manufacturing an optical fiber preform according to claim 1,
- wherein the heating and the slowly cooling are performed by using a flame.

8. The method of manufacturing an optical fiber preform according to claim 1,
- wherein, the optical fiber preform is a multi-core optical fiber preform.

9. A method of manufacturing an optical fiber preform, the method comprising:
- melting and connecting a glass pipe to each end of a cladding pipe provided with a hole so as to surround a periphery of the hole;
- heating a connecting part between the cladding pipe and the glass pipe at a heating temperature below a melting temperature of the connecting part; and
- after the heating, slowly cooling the connecting part from the heating temperature,
- wherein in the slowly cooling, a difference between a surface temperature of the cladding pipe at a position away from the connecting part by 10 mm in an axial direction and a surface temperature of the glass pipe at a position away from the connecting part by 10 mm in the axial direction is 0° C. to 200° C.

10. The method of manufacturing an optical fiber preform according to claim 9,
- wherein, in a case where rapid cooling of the connecting part occurs after the slowly cooling, the heating and the slowly cooling are reperformed.

* * * * *